No. 741,668. PATENTED OCT. 20, 1903.
C. E. HUTCHINGS.
CAMERA BACK.
APPLICATION FILED APR. 6, 1903.
NO MODEL.
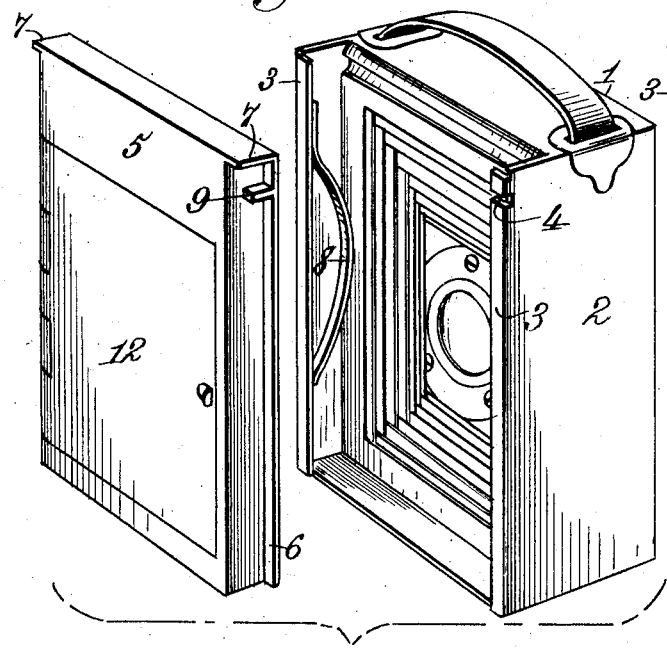
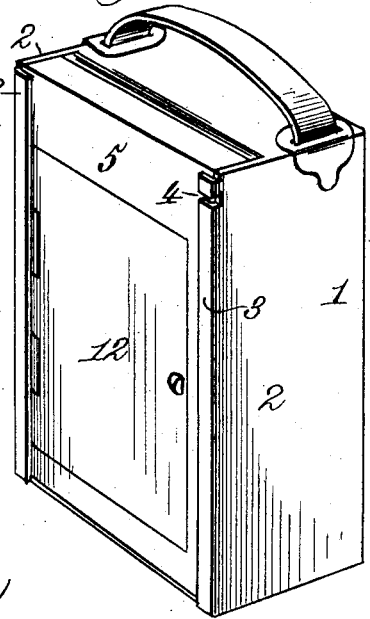
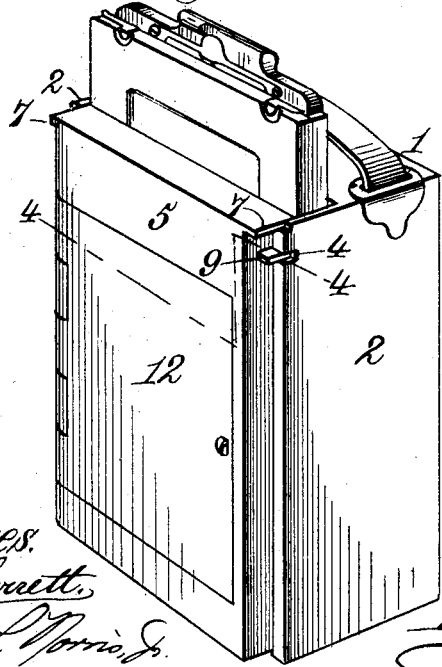
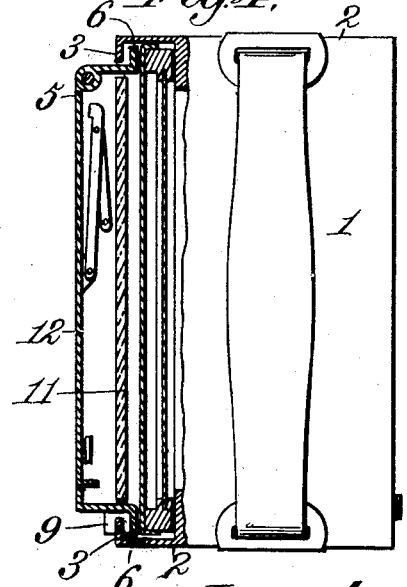
Witnesses.
Robert Everett,
James L. Norris, Jr.
Inventor.
Charles E. Hutchings.
By James L. Norris.
Atty.

No. 741,668. Patented October 20, 1903.

UNITED STATES PATENT OFFICE.

CHARLES E. HUTCHINGS, OF ROCHESTER, NEW YORK, ASSIGNOR, BY MESNE ASSIGNMENTS, TO ROCHESTER OPTICAL COMPANY, OF ROCHESTER, NEW YORK, A CORPORATION OF NEW YORK.

CAMERA-BACK.

SPECIFICATION forming part of Letters Patent No. 741,668, dated October 20, 1903.

Application filed April 6, 1903. Serial No. 151,345. (No model.)

*To all whom it may concern:*

Be it known that I, CHARLES E. HUTCHINGS, a citizen of the United States, residing at Rochester, in the county of Monroe and State of New York, have invented new and useful Improvements in Camera-Backs, of which the following is a specification.

This invention relates to photographic cameras, and has for its object to provide a camera with an improved back which is yieldingly movable toward and from the rear end of the camera-box and is vertically removable therefrom, the arrangement being such that a plate-holder may be inserted between the back and the rear end of the camera-box in proper position to have cast on the plate contained by the holder the view projected thereon by the objective, and which also permits of the ready removal of the plate-holder and the camera-back.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a detailed perspective view showing the rear end of the camera and the camera-back; Fig. 2, a perspective view of the rear end of the camera with the back in place; Fig. 3, a similar view showing the back arranged in a camera-box and a plate-holder in its relative position and partially withdrawn, and Fig. 4 is a transverse sectional view on the line 4 4, Fig. 3.

Referring to the drawings, the numeral 1 indicates the box or casing of the camera, which is preferably constructed of sheet metal and covered with leather to give it a finished appearance, and at its rear end the sides 2 of the box or casing are bent inwardly at right angles to form the flanges 3, providing a chamber to receive the back of the camera and a plate-holder. One of the flanges 3 is cut away or recessed, as indicated at 4, for a purpose hereinafter explained.

The numeral 5 indicates the back of the camera, which is provided on its opposite vertical edges with laterally-projecting flanges 6, and is also provided at its upper edge, at each corner, with a laterally-projecting flange 7. Attached to the flanges 3 and 4 are bowed springs 8, each of said springs being attached at one end to the adjacent flange and the other end thereof resting loosely against the flange, the arrangement being such that when the camera-back is slipped into place in front of the flanges 3 and 4 the springs will bear against the flanges 6 and hold the camera-back in close contact with the rear end of the bellows-frame.

Projecting laterally from the edge of the back is a projection 9, which is adapted to engage the recessed or cut-away portion 4 of the flange 3, before described, so that when the plate-holder has been inserted in position between the back of the camera and the rear end of the bellows said projection will pass into the cut-away portion of the flange, and when the plate-holder is withdrawn from the camera the back will be held by said lateral projection against vertical movement, so that it cannot possibly be withdrawn with the plate-holder through frictional engagement with the latter.

The back 5 is provided with a ground glass 11 and with a hinged door 12, which is adapted to close and uncover the ground glass.

The distance between the back of the camera and the flanges 3 is such as to permit of the back being moved rearwardly to allow a plate-holder being inserted between said back and the camera box or casing, and when a plate-holder is inserted between the back and the camera box or casing the back is forced thereby rearwardly against the tension of the springs 8 until the flanges of the back engage the inwardly-turned flanges of the box of the camera, and the back is thus forced rearwardly equal to the thickness of the plate-holder. When the plate-holder has been inserted and has forced the back of the camera rearwardly in the manner described, the projection 9 on the edge of the camera-back is forced into the cut-away portion 4 of the adjacent flange. When the plate-holder is pulled out from the camera, it has a tendency through its frictional engagement with the back to pull the latter vertically out of its place; but owing to the fact that the projection 9 upon the insertion of the plate-holder has passed into the cut-away portion 4 of one of the flanges it will be impossible to raise the camera-back until the plate-holder has been removed therefrom, whereupon under the impulses of the springs 8 the camera-back will be forced inwardly, causing the projection to pass out of the cut-away flange, and the back may then be readily removed by sliding it out of the camera-box.

From the foregoing description it will be obvious that while the back is readily removable from the camera box or casing it is absolutely impossible to remove said back until the plate-holder has been withdrawn therefrom.

Having thus described my invention, what I claim as new, and desire to secure by Letters Patent, is—

1. In a camera, the combination with the camera box or casing having inwardly-turned flanges at its rear end; of a removable back having laterally-projecting flanges and arranged to movably fit within the flanges of the camera-box, said camera-box and said camera-back provided with interlocking means whereby on the insertion of a plate-holder, removal of the camera-back is prevented and springs arranged to hold said back to its seat against the camera-box, substantially as described.

2. In a camera, the combination with the camera-box having inwardly-turned flanges at its rear end; of a removable back having laterally-projecting flanges and arranged to movably fit within the flanges of the camera-box to receive a plate-holder, springs arranged to hold the back and the plate-holder to their seats, and automatic means for preventing the removal of the back until the plate-holder has been withdrawn, substantially as described.

3. In a camera, the combination with the camera-box having inwardly-turned flanges at its rear end; of a removable back provided with laterally-projecting flanges and arranged to movably fit within the flanges of the camera-box, springs arranged to hold said back against its seat in the camera-box, and automatic means for preventing, under normal conditions, the removal of said back, substantially as and for the purpose specified.

4. In a camera, the combination with the box or casing having inwardly-turned flanges at its rear end; of a removable back having laterally-projecting flanges and arranged to movably fit within the flanges of the camera-box, springs arranged to hold said back to its seat against the camera-box, and means made active by the insertion of a plate-holder to prevent removal of said camera-back.

5. In a camera, the combination with the camera-box having inwardly-turned flanges at its rear end, one of said flanges being cut away; of a removable back having laterally-projecting flanges and arranged to fit within the flanges of the camera-box, springs arranged to hold said back against its rearward seat, said back having a laterally-projecting lip or flange arranged to engage the cut-away portion of the flange before mentioned to hold the back against displacement, substantially as and for the purpose described.

In testimony whereof I have hereunto set my hand in presence of two subscribing witnesses.

CHAS. E. HUTCHINGS.

Witnesses:
JOHN A. ROBERTSON,
MINNA STULL.